(12) United States Patent
Almeida et al.

(10) Patent No.: US 12,330,553 B2
(45) Date of Patent: Jun. 17, 2025

(54) VEHICLE FASCIA COMPRISING ACTUATED REFLECTORS

(71) Applicant: Zoox, Inc., Foster City, CA (US)

(72) Inventors: Reginaldo Alves De Almeida, Foster City, CA (US); Pratik Bansal, Redwood City, CA (US); Roberto Dlacic, Foster City, CA (US); Anthony Earl, Witney (GB); Christopher Lawrence Jackson, Wakefield, MA (US); Da Liu, Milpitas, CA (US); Carter William McEathron, Mountain View, CA (US); Ryan William McGaughey, San Mateo, CA (US); Fabricio Cesar Oda, Dublin, CA (US); Amanda Brown Prescott, Oviedo, FL (US); Jesse Ian Walker, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/435,298

(22) Filed: Feb. 7, 2024

(65) Prior Publication Data
US 2024/0270160 A1    Aug. 15, 2024

Related U.S. Application Data

(60) Provisional application No. 63/444,873, filed on Feb. 10, 2023.

(51) Int. Cl.
*B60Q 1/30* (2006.01)
*B60Q 1/34* (2006.01)

(52) U.S. Cl.
CPC ............... *B60Q 1/30* (2013.01); *B60Q 1/346* (2013.01)

(58) Field of Classification Search
CPC ...................................................... B60Q 1/346
See application file for complete search history.

(56) References Cited

U.S. PATENT DOCUMENTS

| | | | | |
|---|---|---|---|---|
| 5,967,580 | A  * | 10/1999 | Rosheim | B25J 17/0275 901/29 |
| 6,658,962 | B1 * | 12/2003 | Rosheim | B25J 17/0275 901/26 |

(Continued)

FOREIGN PATENT DOCUMENTS

| | | | | |
|---|---|---|---|---|
| JP | 2009078625 | A |   | 4/2009 |
| JP | 2015227156 | A | * | 12/2015 ............... B60Q 1/30 |
| KR | 20040006861 | A |   | 1/2004 |

OTHER PUBLICATIONS

Case Law: *Ross-Hime Designs, Inc.* v *The United States*, 28 U.S.C. § 1498.*

(Continued)

*Primary Examiner* — Keith G. Delahoussaye
(74) *Attorney, Agent, or Firm* — Lee & Hayes, P.C.

(57) ABSTRACT

A vehicle may comprise an actuator system. The actuator system may comprise an indicia portion (e.g., a retroreflector, etc.), a masking element that exposes the indicia portion in a first state and covers the indicia portion in a second state, and a linkage coupling the masking element to an actuator. In the case of a bidirectional vehicle, operation of the actuator may be based at least in part on a determination of the vehicle changing a direction of travel. The actuator system may cause a first set of one or more actuator systems disposed on a first end of the vehicle to transition from a first state to a second state and/or cause a second set of one or more actuator systems disposed on a second end opposite the first end of the vehicle to transition from the second state to the first state.

20 Claims, 12 Drawing Sheets

(56) References Cited

U.S. PATENT DOCUMENTS

| | | | |
|---|---|---|---|
| 8,061,878 B1 | 11/2011 | Kuntz | |
| 11,242,972 B2 | 2/2022 | Hong et al. | |
| 2018/0081058 A1* | 3/2018 | Kalscheur | G01S 17/58 |
| 2021/0171064 A1* | 6/2021 | Mimura | B60Q 1/545 |
| 2021/0180772 A1 | 6/2021 | Liu et al. | |
| 2025/0074295 A1 | 3/2025 | Aguirre Contreras | |

OTHER PUBLICATIONS

Miria et al., Comparative Evaluation of Linear-Rotary Actuator Topologies for Highly Dynamic Applications, Power Electronic Systems Laboratory, ETH Zurich, Zurich, Switzerland, IEEE (Year: 2017).*

Search Report and Written Opinion for International Application No. PCT/US2024/015050, Dated May 30, 2024, 11 pages.

* cited by examiner

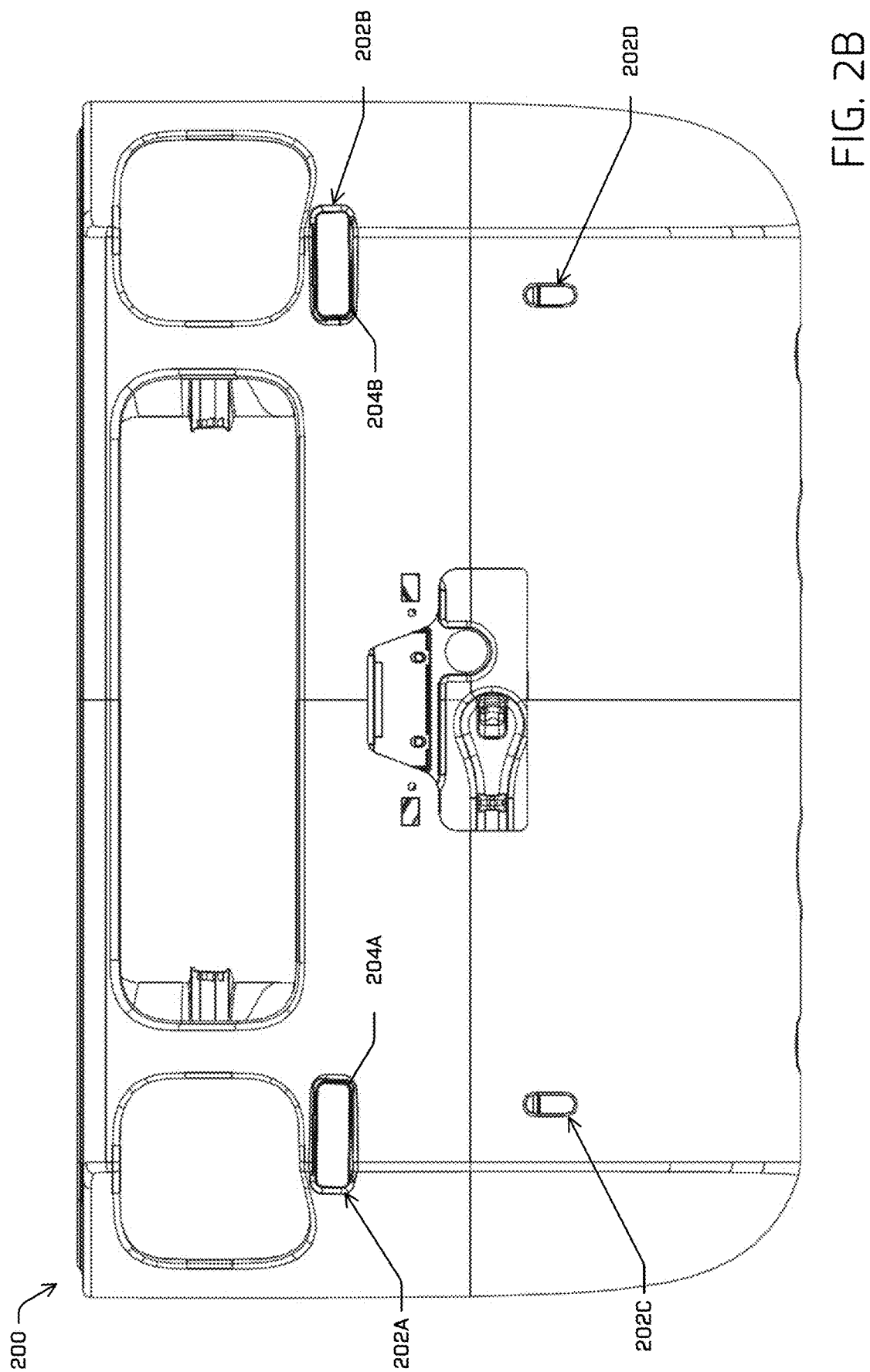

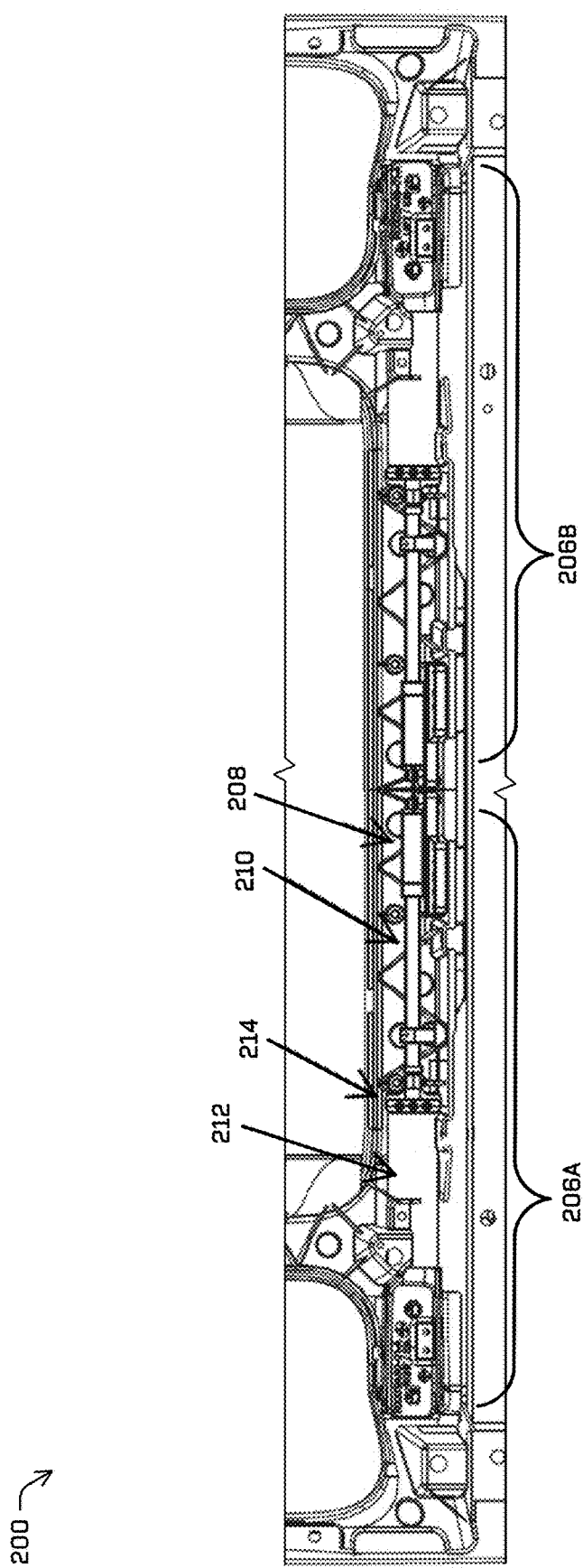

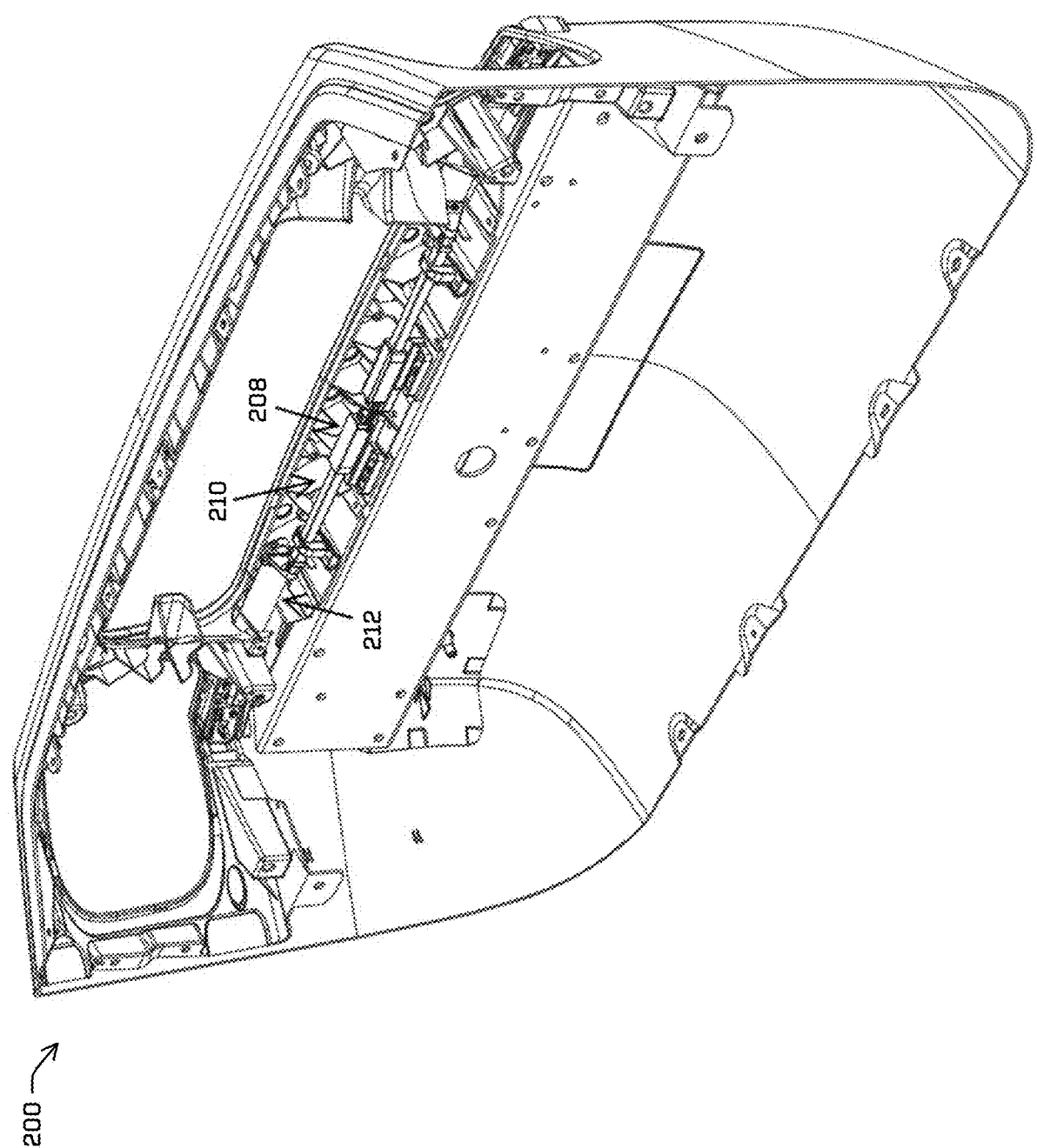

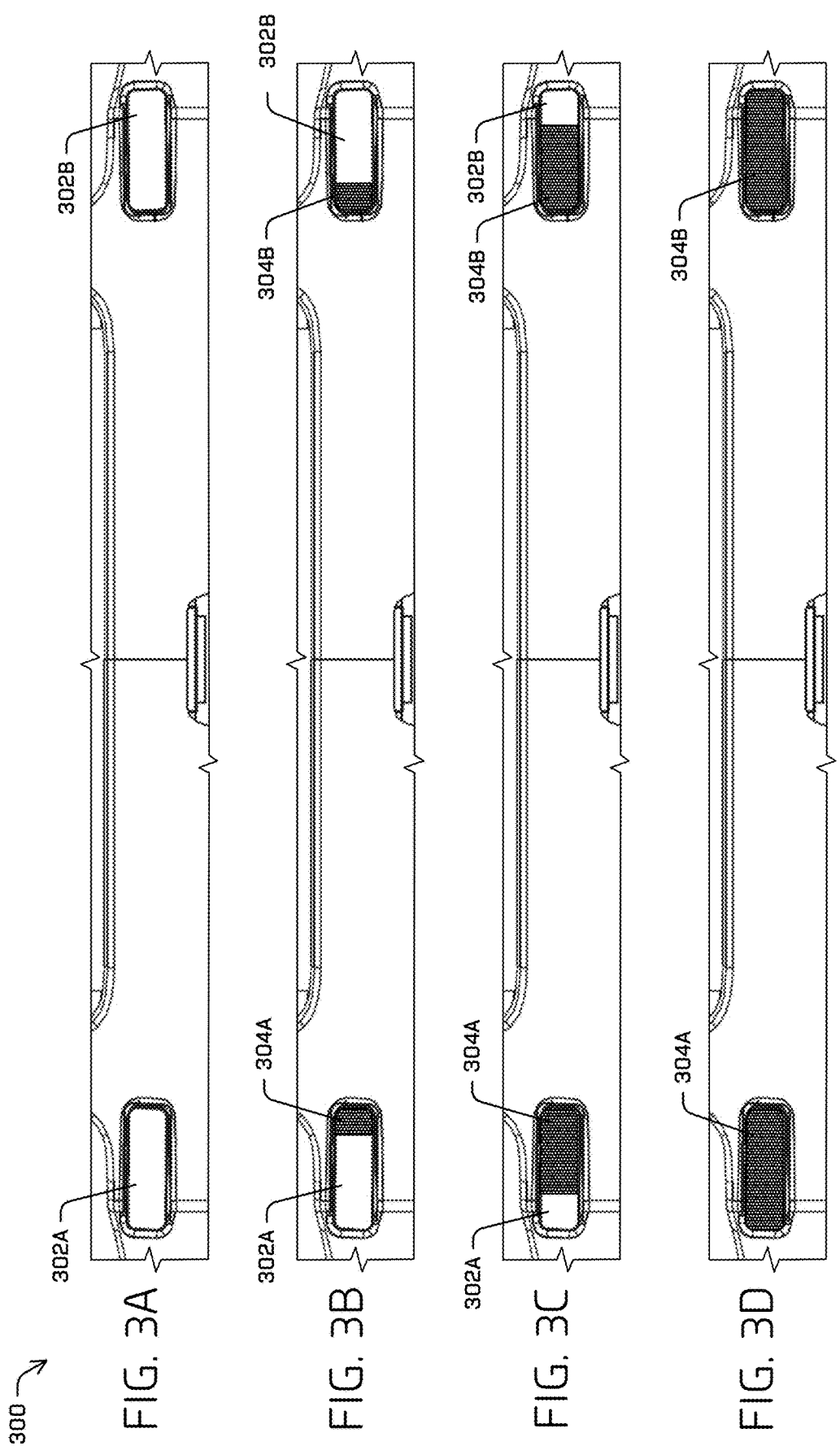

VEHICLE FASCIA COMPRISING ACTUATED REFLECTORS

RELATED APPLICATIONS

This Application claims the benefit of, and priority to, U.S. Provisional Application No. 63/444,873 filed on Feb. 10, 2023, which is incorporated herein by reference in its entirety.

BACKGROUND

Various devices may be used in vehicles to increase their safe operation in an environment. As an example, vehicles may have different colored reflective features to help indicate a direction of travel. However, such safety features may not function properly in non-traditional vehicles (such as those vehicles capable of traveling equally in any of a plurality of directions). Relying on traditional safety features may, in those vehicles, cause issues while driving.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

FIG. 2B depicts a front view of the vehicle fascia including the indicia portion.

FIG. 2D depicts a back view of the vehicle fascia including an actuator system for operatively exposing or covering the indicia portion of the vehicle fascia.

FIG. 2E depicts a top, back, right-side perspective view of the vehicle fascia including the actuator system for operatively exposing or covering an indicia portion of the vehicle fascia.

FIG. 3A depicts a front view of the vehicle fascia showing a first state of the actuator system's control of a masking component where the first state exposes the indica portion.

FIGS. 3B-3C depict the front view of a vehicle fascia showing a first and second part of a transition from the first state of the actuator system's control of a masking component to a second state.

FIG. 3D depicts the front view of the vehicle fascia showing a second state of the actuator system's control of the masking component where the second state covers the indica portion.

DETAILED DESCRIPTION

Figure 1A:
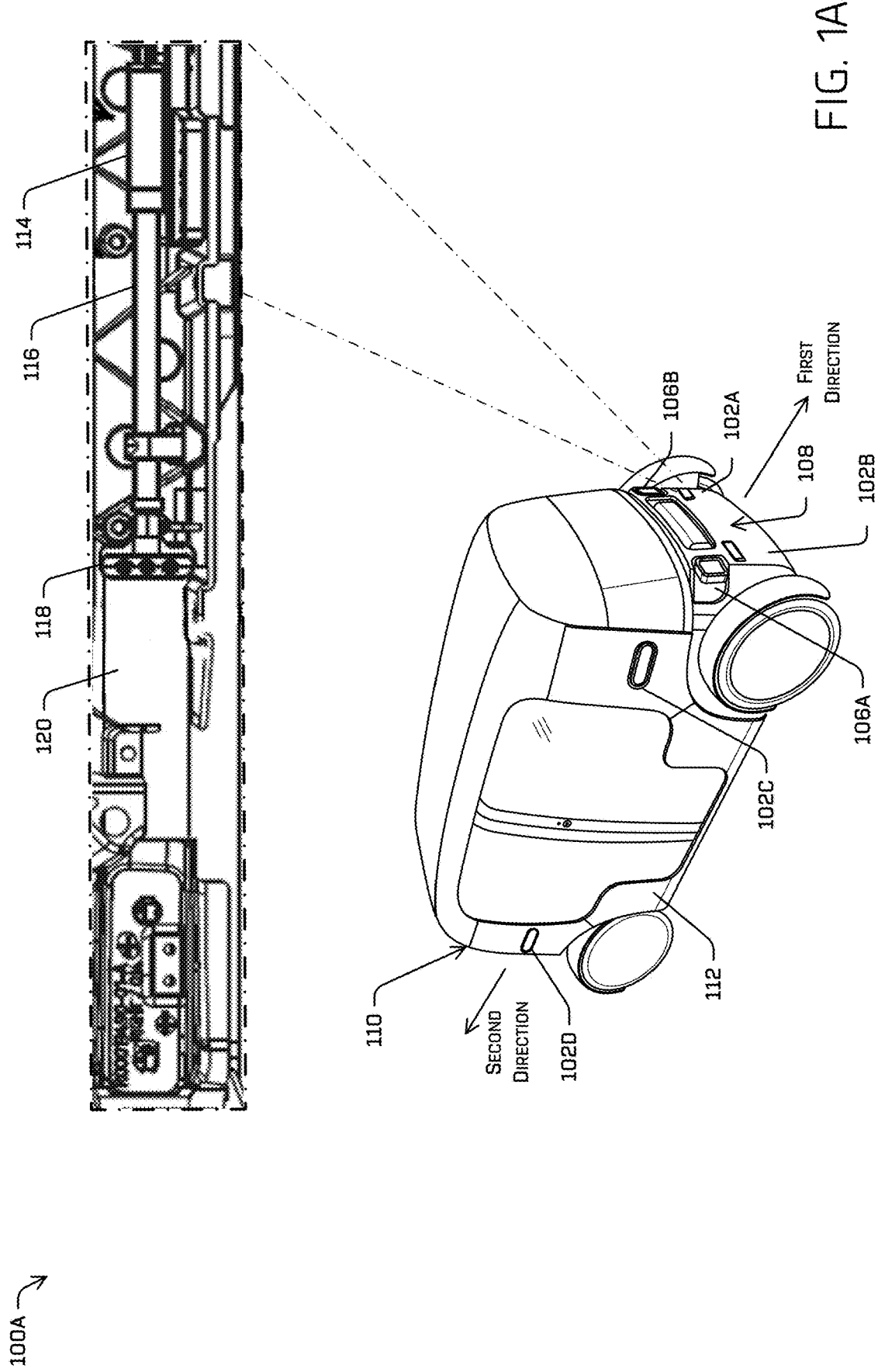
FIG. 1A depicts a perspective view of an example vehicle including various actuator systems. The excerpted view illustrates an actuator system, in accordance with an example of the present disclosure.

As discussed above, conventional vehicles may have stationary, static reflectors at each end of the vehicle. For instance, conventional vehicles typically have a white reflector on the front of the vehicle and a red reflector on the rear of the vehicle such that operators of other vehicles may quickly glean an orientation or direction of travel even when the vehicle is stationary and/or powered off. For a bidirectional vehicle, such as one described in U.S. Pat. No. 11,242,972, filed Sep. 11, 2019, the entirety of which is incorporated by reference herein for all purposes, this presents a problem, since either end of the vehicle may be either the front (leading end) or rear (trailing end) of the vehicle depending on the direction of travel of the vehicle. A change in a direction of travel may represent a reversal of the direction of travel. Such bidirectional vehicles are equipped with lighting that changes to indicate the directionality of the vehicle. For example, the bidirectional vehicle may be equipped with a system to control the lights of the vehicle such that, in a first state, a first set of lights associated with one longitudinal end of the vehicle are illuminated with a white hue to indicate a front of the vehicle and a second set of lights associated with another longitudinal/opposite end of the vehicle are illuminated with a red hue to indicate a back of the vehicle. This may be inverted when the vehicle changes its operating direction by changing the lighting system to a second state illuminating the first set of lights with a red hue and the second set of lights with a white hue. Despite such lighting changes, additional safety features may be desired or required, such as a leading retroreflector and/or leading reflector of a first color and trailing reflector of a second color. The techniques discussed herein comprise actuator systems for operationally (e.g., mechanically, electrically, electromechanically, programmatically) exposing or masking an indicia portion of a vehicle fascia based on a direction of travel of the vehicle (e.g., a reversal of a direction of travel). An indicia portion may include, for example, a retroreflector, emitters, license plate(s), RFID tag(s), permit(s) (e.g., parking permits, location access permits), displays (e.g., Liquid Crystal Displays (LCDs), Organic Light-Emitting Diode (OLED) display, Active Matric Organize Light-Emitting Diode (AMOLED) display, E-ink display, LED display, Micro LED, etc.), identification number (Vehicle Identification Number (VIN), registration numbers, etc.), machine-readable code (e.g., codes that may be scanned or read by machines are used for tracking, identification, providing information, etc.), and the like, although the discussion herein uses a retroreflector as an example throughout. In some examples, the actuator system may expose a retroreflector in a first state and mask the retroreflector in a second state. Of course, the above example is not meant to be so limiting and is merely included for illustrative purposes. The technology discussed herein may be equally applied to traditional vehicles or otherwise.

The example actuator systems may be duplicated in both quarter panels of a same side of the vehicle and/or may be duplicated on opposite sides of the vehicle, such as in the bidirectional autonomous vehicle example described above.

In some examples, retroreflectors of opposite sides and/or longitudinal ends of the vehicle may be maintained in opposite states. For example, first retroreflector(s) associated with one longitudinal end of the vehicle, such as associated with a direction of travel, may be exposed while retroreflector(s) on an opposite longitudinal end (e.g., a trailing end) of the vehicle may be covered. Note that it is contemplated that in some examples the states on opposite sides and/or longitudinal ends of the vehicle may be the same. In some examples, actuator systems according to this disclosure may comprise a controller, an actuator, a linkage, a masking element, and an indicia portion (e.g., retroreflector). In some examples, the actuator system may further comprise a seal. In some examples, the actuator system may comprise a controller that is configured to receive signals from one or more system and/or subsystems associated with vehicle (e.g., perception system(s) (e.g., systems that gather environmental data), sensor systems (LiDAR, radar, cameras, ultrasonic, etc.), localization system(s) (e.g., systems that determine the a location of the vehicle), mapping system(s) (e.g., systems that provide maps of the road network, including lane information, traffic signs, road geometry, etc.), control system(s) (e.g., systems that generate and/or execute a planned trajectory by controlling the vehicle's acceleration, braking, steering, and other driving functions), communication systems (e.g., systems that enable the vehicle to communicate or interact with other vehicles on the road, infrastructure, cloud-based services, etc.), diagnostic and monitoring systems (e.g., systems that monitor health and performance of various components and provide feedback for maintenance and/or troubleshooting), or any other system associated with the vehicle. Again, such is merely an example and the techniques described herein may be applied to various portions of a vehicle for changing an indication of state.

In some examples, the motor may be connected to the masking element via a linkage such that operation of the motor alternately retracts the masking element to expose the retroreflector in a first state or positions the masking element to cover the retroreflector in a second state. The motor may couple to the masking element through one or more linkages and/or components to cause the masking element to transition between the first state and the second state in response to actuation of the motor. In some examples, the motor may be any motor suitable for providing force to the linkage, such as an electromechanical actuator, servomotor, electric motor, brushless motor, stepper motor, electro-hydraulic system, linear actuator, pneumatic actuator, belt driven system, and the like.

In some examples, the fascia may comprise an exterior side and an interior side and the motor may be disposed on the interior side of the fascia, i.e., behind the fascia. In some examples, the linkage may also be disposed on the interior side of the fascia, although, in some examples, at least part of the fascia may be disposed on the exterior side of the fascia. In the latter example, an exposed portion of the linkage may be concealed with a cover and/or a seal.

The linkage may comprise a hydraulic piston, pin, arm, and/or the like that may be configured to transfer force generated by the motor onto a portion of the masking element configured to couple with the linkage to receive force generated by the motor. The linkage may, in some examples, include multiple linkage components that couple together between the motor and the masking element. The linkage may, in some examples, incorporate various linkages or components that may couple to the motor, the masking element, the vehicle body, the vehicle frame, and/or any combination thereof. For example, the motor may be a stepper motor and the linkage may include a rack and/or pinion to slide the masking element on tracks or other guides. In a different example, the linkage could include a cam and/or rotary mechanical linkage.

The masking element may be composed of a same or similar material to a fascia of the vehicle, such as a polymer, carbon fiber, metal, composite, or the like, but may, in other examples, be a different material than a fascia of the vehicle. In an additional or alternate example, the masking element may further comprise an indica adhered or otherwise affixed or composing the masking element such that covering a first indicia with the masking element reveals a second indicia associated with the masking element. For example, the masking element may comprise a red retroreflector that may be slid over a white retroreflector and may be retracted to reveal the white retroreflector, depending on the direction of travel of a bidirectional vehicle. In yet another example, the masking element may be an elongated strip comprising two indicia, such as a white retroreflector and red retroreflector. The motor may actuate to slide the elongated strip to reveal a suitable portion (i.e., the white retroreflector portion or the red retroreflector portion) depending on the direction of travel. In such an example, the elongated strip may cover a third indica or may be used on its own without covering any other indicia. The masking element may be settled into channels in the fascia configured to constrain motion of the masking element along a plane or shape defined by the fascia. The channels may be formed (e.g., molded or machined) directly into the facia, or may be coupled to the fascia (e.g., in the form of rails, tracks, or other guides coupled to the fascia). In an additional or alternate example, the channels into which the masking element is settled may be disposed in the seal.

The masking element may rest in a first position, such as settled into a storage position such that it fits or matches an external shape and/or configuration of the vehicle. The masking element may be repositioned by the motor and linkage to move from the first position to a second position. In the first position, the masking element may reveal or expose a retroreflector, indicator, light, or other feature on the vehicle. In the second position, the masking element may alternately cover or conceal the retroreflector, indicator, light, or other feature (in whole or in part). In this manner, the masking element may be configured to alternately conceal and/or reveal one or more features on a visible external surface of a vehicle. The masking element may be configured to conceal and/or reveal the elements based on the actuation of the motor and connecting linkage.

In some examples, the masking element may additionally or alternatively include a switchable component, such as switchable glass (e.g., privacy glass), to change an opacity of the masking element in response to a command from the controller. In such examples, the motor and/or linkage may instead correspond to electrical and/or electromechanical connections to the switchable glass configured to cause the switchable glass to transition from an opaque state to a transparent state in response to a signal from the controller. The masking element may be configurable between an opaque state wherein the masking element prevents light from passing through the masking element, thereby concealing a vehicle component positioned behind the masking element and/or preventing light from emitting from the vehicle component, and a transparent state that enables the vehicle component to be viewed and/or interacted with, such as to reveal a retroreflector, vehicle indicia, or to allow light from the vehicle component to be transmitted.

In some examples, the controller may receive instructions from a planning component of the autonomous vehicle. The planning component may comprise one or more machine-learned models to generate a trajectory for controlling motion of the autonomous vehicle based at least in part on sensor data. In additional or alternate example where the vehicle is driver-controlled, the instructions may be received from a component that indicates a directionality of travel of the vehicle. Regardless, the instructions may indicate a directionality of the vehicle, distinguishing one longitudinal end of the vehicle as the front (i.e., leading end) and an opposite longitudinal end of the vehicle as the back (i.e., trailing end), according to normal traffic laws. The controller may receive these instructions and may alter a state of the actuator system based at least in part on these instructions. For example, where the instructions indicate a first driving configuration of the vehicle, the controller may transmit a signal or control a first motor to actuate such that a first masking element retracts to expose a first retroreflector associated with a first longitudinal end of the vehicle (i.e., the front in the first driving configuration) and a second motor to actuate and position a second masking element to cover a second retroreflector associated with a second longitudinal end of the vehicle (i.e., the back in the first driving configuration. In a second driving configuration, this may be inverted. The controller may cause the respective motors to actuate to cover the first retroreflector and expose the second retroreflector.

In some examples, the controller may additionally or alternatively receive sensor data indicating a location of the vehicle and may determine, based at least in part on regulation data stored in a memory or retrieved via a network, regulations that may alter operations of the controller, such as by operating motor(s) to cover all retroreflectors when the controller determines, based at least in part on the sensor data, that the location is associated with a jurisdiction identified in the regulation data as not requiring the retroreflectors.

Note that although this discussion pertains to retroreflectors, the concept may be extended to light emitters disposed on the vehicle, license plate(s), RFID tag(s), permit(s) (e.g., parking permits, location access permits), display(s) (e.g., Liquid Crystal Display (LCD), Organic Light-Emitting Diode (OLED) display, Active Matric Organize Light-Emitting Diode (AMOLED) display, E-ink display, LED display, Micro LED display, etc.), identification number (Vehicle Identification Number (VIN), registration number, etc.), machine-readable code (e.g., codes that may be scanned or read by a machine are/or used for tracking, identification, providing information, etc.), and the like.

In some examples, the actuator system may further comprise a seal disposed around the retroreflector to provide a surface that protects interior components from invasive material, such as water or dust, and/or to wipe clean the masking element as it retracts to expose the retroreflector. In such an example, the seal may be made from a pliable material such as rubber, silicone, polymer, an analog thereof, and/or a combination thereof. In some examples, the seal may be treated with a hydrophobic or otherwise weather resistant coating.

FIG. 1A depicts a perspective view of an example vehicle 100A including various actuator systems 102A, 102B, 102C, and 102D (collectively "actuator systems"). The excerpted view illustrates an example actuator system comprising an actuator 114, a linkage 116, a coupler 118, and/or a masking element 120. Additional details regarding operation of the example actuator system are discussed below relative to FIG. 2D.

Vehicle 100A, as an example, is depicted as being a passenger vehicle having four wheels/tires. Other types and configurations of vehicles are contemplated, such as, for example, vans, sport utility vehicles, crossover vehicles, trucks, buses, agricultural vehicles, trains, and construction vehicles. Vehicle 100A may be powered by one or more internal combustion engines, electric motors powered by one or more power supplies (e.g., batteries, hydrogen fuel cells, etc.), or any combination thereof. In addition, although vehicle 100A is illustrated to have four wheels/tires, the systems and methods described herein may be incorporated into vehicles having fewer or a greater number of wheels, tires, and/or tracks. Vehicle 100A in this example is a bidirectional vehicle having four-wheel steering and may operate generally with equal performance characteristics in all directions, for example, such that a first end 108 of vehicle 100A is the front end of the vehicle when traveling in a first direction, and such that first end 108 becomes the rear end of the vehicle when traveling in the opposite, second direction, as illustrated in FIG. 1A. Similarly, a second end 110 of the vehicle is the front end of the vehicle when traveling in the second direction, and first end 108 becomes the rear end of the vehicle when traveling in the second direction. These example characteristics may facilitate greater maneuverability, for example, in small spaces or crowded environments, such as parking lots and urban areas. Thus, because of a bidirectionality of vehicle 100A, each of the actuator systems may be configured to expose or mask an indicia portion of a vehicle fascia based on a direction of travel.

In some examples, vehicle 100A may be an autonomous vehicle configured to operate according to a Level 5 classification issued in 2016 by the U.S. National Highway Traffic Safety Administration, which describes a vehicle capable of performing all safety-critical functions for an entire trip, with the driver (or occupant) not being expected to control the vehicle at any time. In that case, since the vehicle may be configured to control all functions from start to stop, including all lighting functions, it may be unoccupied. This is merely an example, however, and the systems and methods described herein may be incorporated into any ground-borne vehicle, including those that are manually driven by a human and those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. Of course, such techniques need not be implemented in a vehicle at all and may be implemented in various systems and apparatuses.

A first actuator system may be disposed on a first longitudinal end of a bidirectional vehicle and a second actuator system may be disposed on the second longitudinal end (i.e., opposite end) of the bidirectional vehicle. If the vehicle is travelling so that the first end of the vehicle is leading the second end, then the first actuator system may be configured in a second state that conceals a retroreflector configured to reflect red light into the environment. That is, the red retroreflector is covered so that the leading end is not mistaken for the trailing end. In some examples, the masking element that covers the retroreflector may be associated with a different color retroreflector than the retroreflector that is covered (e.g., white or amber). The second actuator system may be configured in a first state that exposes a red retroreflector that indicates the rear (or trailing end) of a vehicle. On the other hand, if the vehicle is travelling so that the second end of the vehicle is leading the first end, then the first actuator system may be configured in the first state (e.g., by exposing a red reflector), and the second actuator system may be configured in the second state (e.g., by concealing the red retroreflector using a masking element). As would be appreciated, the same effect may be accomplished by reversing which component is masked or revealed.

One or more actuator system(s) may be disposed about vehicle 100A. In some examples, an actuator system may be disposed below a headline, as shown in FIG. 1A. In some examples, one or more actuator system(s) may be incorporated into a headlamp, turn signal, other light fixture on the vehicle, bumper, etc. A first actuator system may be located in a first part of the vehicle and a second actuator system may be located in a second part of the vehicle. For example, two actuator systems (102A and 102B) may be disposed on a first end 108 (e.g., a fascia) of a bidirectional vehicle and two other actuator systems (not visible in FIG. 1A) may be disposed on the second end 110 of the bidirectional vehicle. Additional actuator systems, such as actuator system 102C and actuator system 102D may be disposed on a side of the vehicle. In some examples, one or more actuator systems may be disposed proximate, below, above, etc. a window and/or door of the vehicle.

Though only four actuator systems are depicted in FIG. 1A, additional actuator system(s) may be present on the second end 110 (i.e., opposite longitudinal end) of the vehicle which are not visible in FIG. 1A. Further, any greater or lesser number of actuator systems may be utilized in other examples. An actuator system may be coupled to a component of vehicle 100A including one or more fascia, quarter panels, wheel(s), doors, roof, body, bumper, underside, interior, exterior, etc. depending on a desired functionality. For example, an actuator system may be duplicated in both quarter panels of a same side of vehicle 100A and/or may be duplicated on opposite longitudinal ends of the vehicle, such as in the bidirectional vehicle example described above.

Actuator systems disposed on a vehicle may differ depending on the location of the actuator system. For example, actuator system 102A and actuator system 102B, which are disposed on a longitudinal end of vehicle 100A, may be configured to expose a first color retroreflector (e.g., red) when in a first state and cover the retroreflector when in the second state while actuator system 102C and actuator system 102D disposed on a side 112 of vehicle 100A proximate the vehicle door and may be configured to expose and cover a different type of indicia portion (e.g., be configured to expose and cover a RFID tag, permit, etc.). In some examples, actuator systems that are disposed on a first longitudinal end (e.g., leading end) and second longitudinal end (e.g., trailing end) opposite the first end may be associated with actuator systems that comprise a linear actuator while actuator systems disposed on one or more sides of the vehicle may comprise a rotary actuator, or other type of actuator, and vise versa.

In at least one example, an actuator system may comprise a retroreflector configured to passively reflect light and a masking element configured to expose or conceal the retroreflector. In some examples, depending on applicable rules, regulations, laws, a side marker light may be included on an actuator system disposed on a leading and/or trailing end of a vehicle and not on an actuator system disposed on a side of the vehicle. An actuator system may be configured to expose a retroreflector having a particular color when in a first state (e.g., an open state). Here, color of a retroreflector refers to the color of light that exits the retroreflector. For example, a retroreflector may comprise a colored material (e.g., plastic, glass, etc.) that reflects a portion of the spectrum of incoming white light, wherein the portion corresponds to the color of the reflector. In some examples, a masking element 120 of the actuator system may opaque such that light from the environment cannot reach the indicia portion behind the masking element 120. In some examples, the masking element 120 may be associated with a retroreflector that reflects light of a different color (e.g., amber or white). That is, an opaque surface of the masking element that is exposed to the environment may be associated with a retroreflector that is configured to reflect light of a different color without interfering with the indicia portion. In some examples, the masking element may reveal or conceal an active lighting component or other form of information display.

Actuator systems disposed on opposite ends (or longitudinal ends) of the vehicle may be maintained in different or opposite states. For example, first actuator system(s) disposed on a first end 108 of the vehicle 100A (e.g., a leading end) may be associated with a first state (e.g., where the masking element is in a position that covers an indicia portion) and second actuator system(s) associated with a second end 110 of the vehicle may be associated with a second state (e.g., where the masking element is in a position that exposes the indicia portion). In at least one example, it is contemplated that the states of the actuator systems on opposite sides of the vehicle 100A may be the same, depending on applicable rules, regulations, laws, and other considerations, for example.

A controller may be configured to receive signals from various systems or components. For example, a controller may receive an electrical signal from a planner component of the vehicle indicating a change in a state of a vehicle (e.g., a change in an orientation or configuration related to a direction of travel or an indication that the vehicle is about to change an orientation of travel) and may cause the actuator systems to transition a masking element from a first state to a second state. A controller may also receive signal(s) from other components or systems including a localizer system, sensor systems, perception system, one or more safety systems, light emitter(s) systems, and other systems or subsystems of a vehicle. In some examples, the controller may be configured to receive signals from a source external to the vehicle such as from an autonomous vehicle service platform, fleet manager, remote computing device (e.g., teleoperator computing device). In some examples, different actuator systems may be configured to communicate or receive signals from different systems or components associated with the vehicle. In additional or alternative examples, the actuator may be coupled to one or more additional components or subcomponents of the vehicle such that the signal comprises one or more of a data or power connection common to the actuator and other component. As a non-limiting example of which, a line providing power to brake lights may be used to power the actuator such that when a signal is sent to power on brake lights, the actuator is also engaged.

When the vehicle is turned off or parked, a most-recent direction of motion of the vehicle may dictate which state the masking elements are in. This ensures that at least some of the masking elements are exposing retroreflectors capable of reflecting light passively, particularly during the evenings when visibility may be diminished. In some examples, actuator system may be a bi-stable device and generally only consume power when changing from one state to another. Once power is removed, the state of the bi-stable actuator system can remain for relatively long period (e.g., indefinitely). For example, if actuator system is bi-stable, then actuator system need not consume power to maintain the state (e.g., position masking element such that an indicia portion is exposed). In such an example, despite loss of power, a bidirectional vehicle may continue to comply with functional safety requirements.

Vehicle 100A is illustrated to also include dual function light units 106A and 106B that may function as headlights when traveling in the first direction and may switch to function as taillights when traveling in the second direction. Light units 106A and 106B may be located at locations of vehicle 100A other than what is indicated in FIG. 1A. In some examples, an actuator system may be located on vehicle 100A above, below, and/or beside the light units 106A and 106B of the vehicle 100A.

Figure 1B:
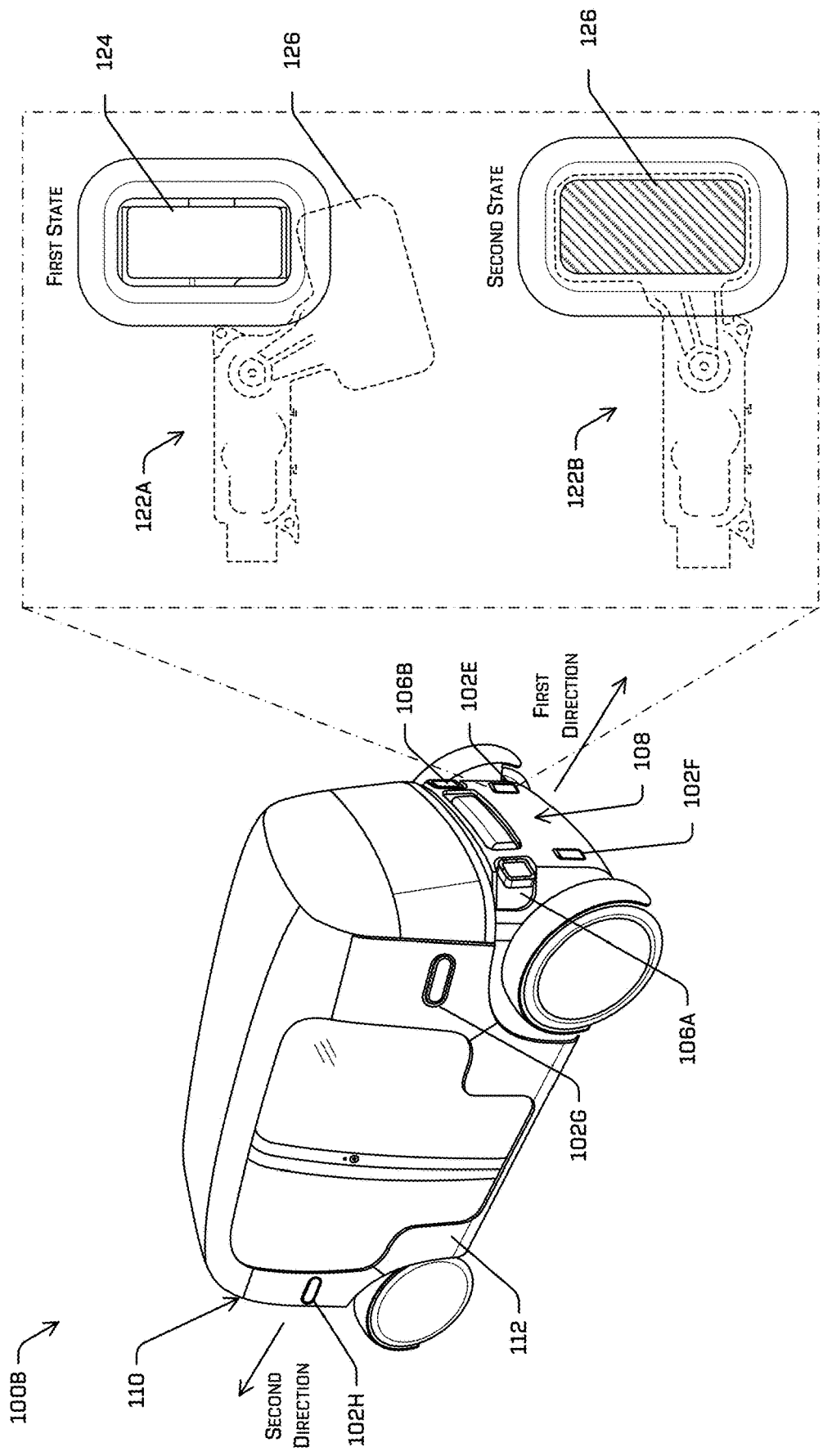
FIG. 1B depicts a perspective view of an example vehicle including various actuator systems. The excerpted view illustrates another example actuator system in a first state and a second state, in accordance with an example of the present disclosure.

FIG. 1B depicts a perspective view of an example vehicle 100B including various actuator systems 102E, 102F, 102G, and 102H. The excerpted view illustrates another example actuator system in a first state 122A and a second state 122B, in accordance with an example of the present disclosure. This figure illustrates the actuator system 102E changing from a first state that exposes an indicia portion (e.g., a retroreflector 124) to the environment to a second state that masks or conceals the indicia portion using a masking element 126. Additional details regarding operation of the example actuator system are discussed below relative to FIG. 4A.

Figure 2A:
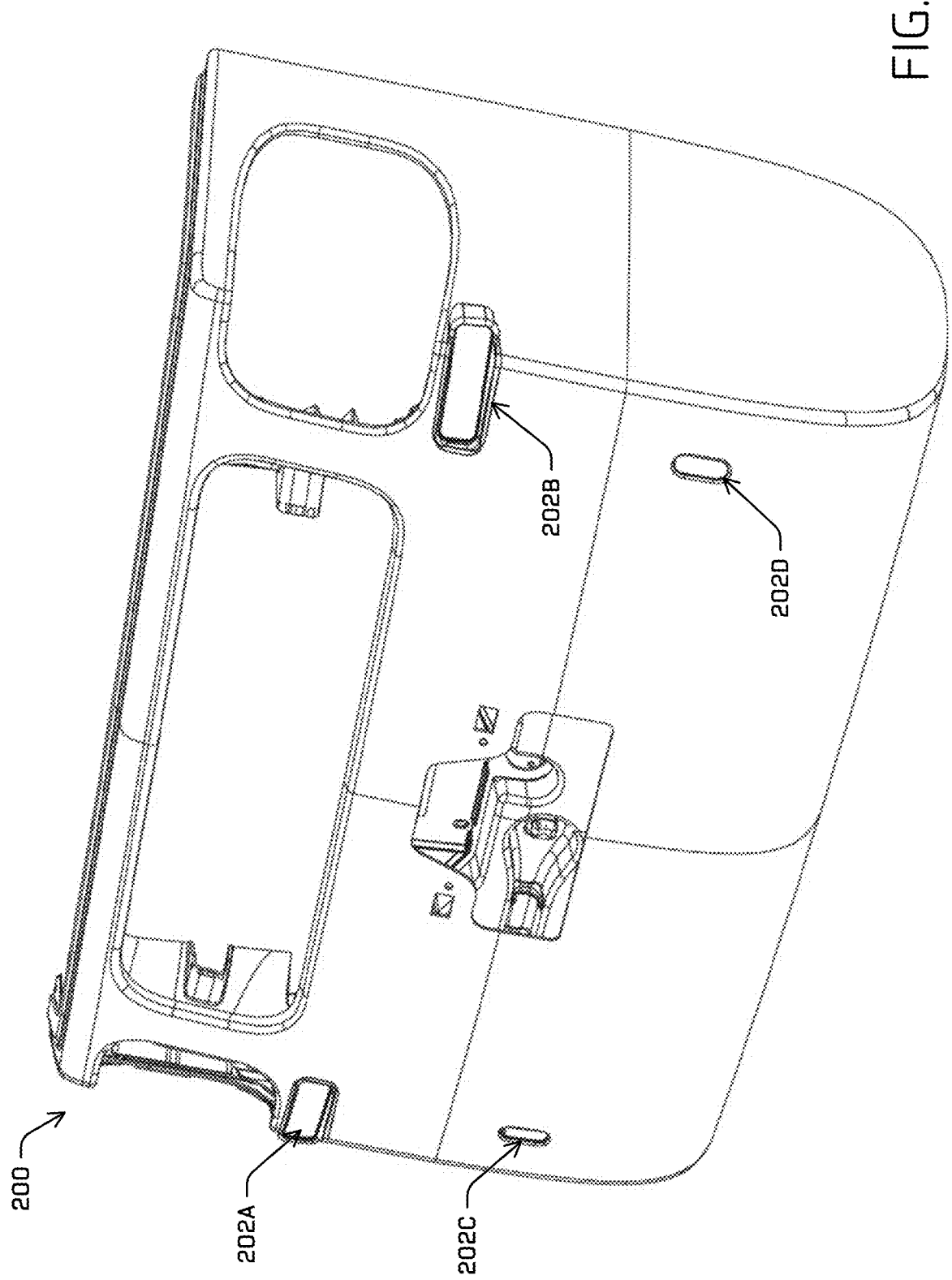
FIG. 2A depicts a top, front, left-side perspective view of a vehicle fascia including an indicia portion.

FIG. 2A depicts a top, front, left-side perspective view of a vehicle fascia 200 including indicia portions 202A, 202B, 202C, and 202D. Though four indicia portions are depicted in FIG. 2A, any number of indicia portions may be associated with the fascia and/or the vehicle. In at least one example, a first controller may be configured to control a masking element that exposes or covers indicia portion 202A and indicia portion 202B and a second controller (or additional controllers) may be configured to control a masking element that exposes or covers indicia portion 202C and indicia portion 202D.

FIG. 2B depicts a front view of the vehicle fascia 200 including the indicia portions 202A, 202B, 202C, and 202D. In some examples, the indicia portions may be covered by a protective, transparent or translucent cover (now shown). In some examples, the cover may be configured to be coupled to an exterior of a vehicle. The cover may be used as a protective cover and prevent rain, dirt, debris, etc. from entering the actuator system and damaging internal components, such as linkages, actuators, etc. In examples, the cover may be formed from a transparent, translucent, and/or weather resistant material, including, for example, plastic, polycarbonate, plastic polymer, acrylic (PMMA), polybutylene terephthalate (PTB), polyethylene terephthalate (PET), acrylonitrile styrene acrylate (ASA), glass, or the like. The cover may have tapered edges such that a view of the indicia portion is not obstructed. The cover may be treated with a hydrophobic or otherwise weather resistant coating. In some examples, the cover may be surrounded by a seal (first seal 204A and second seal 204B) that further prevents prevent rain, dirt, debris etc. from entering the actuator system(s) and/or the vehicle fascia.

Figure 2C:
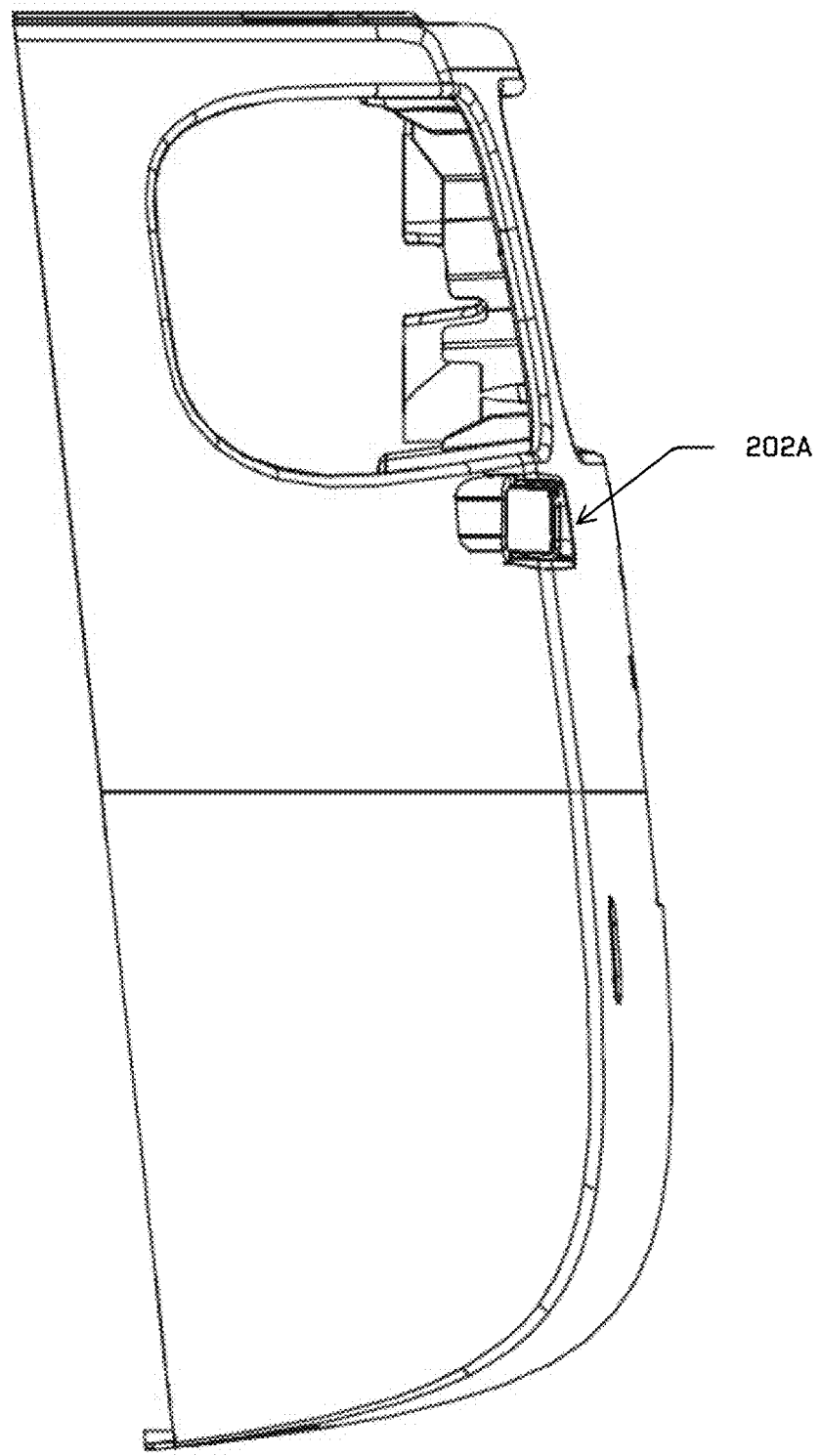
FIG. 2C depicts a right-side view of the vehicle fascia including the indicia portion.

FIG. 2C depicts a right-side view of the vehicle fascia 200 including the indicia portion 202A.

FIG. 2D depicts a back view of the vehicle fascia 200 including a first actuator system 206A for operatively exposing or covering the indicia portion 202A and a second actuator system for operatively exposing or covering the indicia portion 202B. In some examples, the actuator system 206A may comprise a controller (not shown), an actuator 208, a linkage 210, a masking element 212, and an indicia portion (e.g., a retroreflector). The actuator system 206B may comprise of the same or similar components as actuator system 206A. In at least one example, a single controller and/or motor may be configured to cause the masking elements to cover and mask multiple indicia portions such that the indicia portions were exposed/covered at substantially the same time. In some examples, the actuator system may be integrated into the fascia of the vehicle. In other examples, the actuator system may be a self-contained assembly that comprises a retroreflector and masking element in a single, sealed unit.

Actuator 208 may be connected to the masking element 212 via a linkage 210 such that operation of the motor alternately retracts the masking element 212 to expose a retroreflector in a first state or positions the masking element 212 to cover the retroreflector in a second state. The actuator 208 may couple to the masking element 212 through one or more linkage(s) 210, couplers, and/or components to cause the masking element 212 to transition between the first state and the second state in response to actuation of the actuator 208. In some examples, the actuator 208 may be a motor (e.g., a servomotor, electric motor, brushed or brushless motor, stepper motor, hydraulic actuator, electro-hydraulic system, linear actuator, pneumatic actuator, etc.) configured to provide force to the linkage 210. In some examples, the actuator may be a linear actuator configured to generate and impart linear translation motion or force in response to an input signal (e.g., in the form of electrical, hydraulic, or pneumatic energy). For example, a linear actuator may be configured to extend or retract a linkage coupled to the masking element in a linear motion.

In some examples, the linkage 210 may be coupled to the masking element 212 via a coupler 214. The linkage 210 may comprise an elongated, linear rod that couples the actuator to the masking element. The linkage 210 may comprise a hydraulic piston, pin, arm, and/or the like that may be configured to transfer force generated by the actuator 208 onto a portion of the masking element 212. In some examples, the linkage may comprise multiple linkage components that couple together between the actuator 208 and the masking element 212. In some examples, the linkage 210 may incorporate various linkages or components together (e.g., linkage 210 and coupler 214) that may couple to the actuator 208, the masking element 212, the vehicle body, the vehicle frame, and/or any combination thereof. In some examples, the coupler 214 may be configured to couple the masking element 212 to the linkage 210 such that the masking element is offset from the linkage 210 and the actuator 208. That is, the actuator 208 and the linkage 210 may be positioned on a first spatial plane and the masking element 212 may be positioned on a second plane offset from the first plane such that the masking element 212 is positioned further towards the environment external to the vehicle (i.e., relative to the actuator 208 and the linkage 210 which are positioned closer to the vehicle). The coupler 214 may be configured to facilitate the transmission of force between the linkage and the masking element 212 despite the spatial separation along different planes. In some examples, the coupler 214 may be coupled to the masking element in any suitable manner (e.g., adhesive, mechanical linkages such as screws and/or bolts, etc.). In some examples, a portion of the masking element may be configured to fit into a slot associated with the coupler 214.

In at least one example, the actuator 208 comprises a stepper motor and the linkage 210 comprises a rack and/or pinion to slide the masking element 212 on tracks or other guides. In another example, the linkage 210 may comprise a cam and/or rotary mechanical linkage.

The masking element 212 may be composed of the same or similar material to a fascia 200 of the vehicle. For example, the masking element 212 may comprise of a polymer, carbon fiber, metal, composite, or the like. In some examples, the masking element 212 may be the same color as the vehicle. In some examples, the masking element 212 may further comprise an indicia (e.g., a second retroreflector) adhered or otherwise affixed or composing a portion of the masking element that covers a first indicia. In such an example, the masking element may reveal a second indicia associated with the masking element different than the first indicia. For example, the masking element may comprise a colorless (i.e., white) or amber colored retroreflector that may be slid over a red retroreflector and may be retracted to reveal the red retroreflector, depending on the direction of travel of a bidirectional vehicle. In another example, the masking element may comprise a red retroreflector that may be slid over a colorless or amber colored retroreflector and may be retraced to reveal the colorless or amber colored retroreflector.

In at least one example, the masking element may comprise an elongated strip comprising two indicia, such as an amber retroreflector and a red retroreflector. A motor may be actuated to slide the elongate strip to reveal a suitable portion (i.e., the amber retroreflector or the red retroreflector) depending on the direction of travel. In such an example, the elongated strip may cover a third indicia or may be used on its own without covering any other indicia. In some examples, the masking element may be settled into channels (or housing) in the fascia configured to constrain motion of the masking element along a plane or shape defined by the fascia. In an additional or alternative example, the channels or housing into which the masking element is settled may be disposed in a seal.

The masking element 212 may rest in a first position, such as settled in a storage position such that it fits or matches an external shape and/or configuration of the vehicle. The masking element 212 may be repositioned by the motor and linkage and moved from the first position to a second position. For example, while in the first position, the masking element 212 may expose a retroreflector, indicator, light, radio-frequency identification (RFID) tag, permit or other identification number, display, machine-readable code, active lighting, information about the vehicle (such as a vehicle number), or other feature on the vehicle. In the second position, the masking element may alternatively cover the retroreflector, indicator, light, RFID tag, or other feature on the vehicle. In this manner, the masking element 212 may be configured to alternately conceal and/or reveal one or more features on an external surface of the vehicle. Alternatively, the masking element may be associated with a red retroreflector and the indicia portion may be associated with a non-reflective surface, amber retroreflector, white retroreflector, etc. such that the masking element is moved over the indicia portion. Though the masking element in FIG. 2D is depicted and described as being configured to move horizontally (left/right), the masking element and/or the actuator system may be configured such that the masking element moves vertically (up/down) from above or below a retroreflector, or any other direction.

In some examples, the masking element 212 may additionally or alternatively include a switchable component, such as switchable glass (e.g., privacy glass), to change an opacity of the masking element in response to a command from a controller. In such examples, the motor and/or linkage FIG. 2E depicts a top, back, right-side perspective view of the vehicle fascia 200 including the actuator system 206A for operatively exposing or covering an indicia portion of the vehicle fascia.

FIGS. 3A-3D collectively depict a vehicle fascia comprising two indicia portions and two masking elements, where the masking elements are caused to transition from the first state to the second state (e.g., sequentially transition from FIG. 3A to FIG. 3D) or from the second state to the first state (e.g., sequentially transition from FIG. 3D to FIG. 3A).

FIG. 3A depicts a front view of the vehicle fascia 300 showing a first state of the masking component(s) associated with the actuator system(s), where the first state exposes an indicia portion 302A (e.g., a first retroreflector) and indicia portion 302B (e.g., a second retroreflector).

FIGS. 3B-3C depict the front view of the vehicle fascia 300 showing a first part and a second part of a transition from the first state of a masking component to a second state. That is, one or more motors associated with the actuator system(s) may be activated based at least in part on receiving a signal indicating a change in a direction of travel. Based at least in part on receiving the signal, the motor may be activated and cause a first masking element 304A to transition over the first indicia portion 302A and the second masking element 304B to transition over the second indicia portion 302B.

FIG. 3D depicts the front view of the vehicle fascia 300 showing a second state of the first masking element 304A and the second masking element 304B, where the second state covers the indica portion.

Figure 4A:
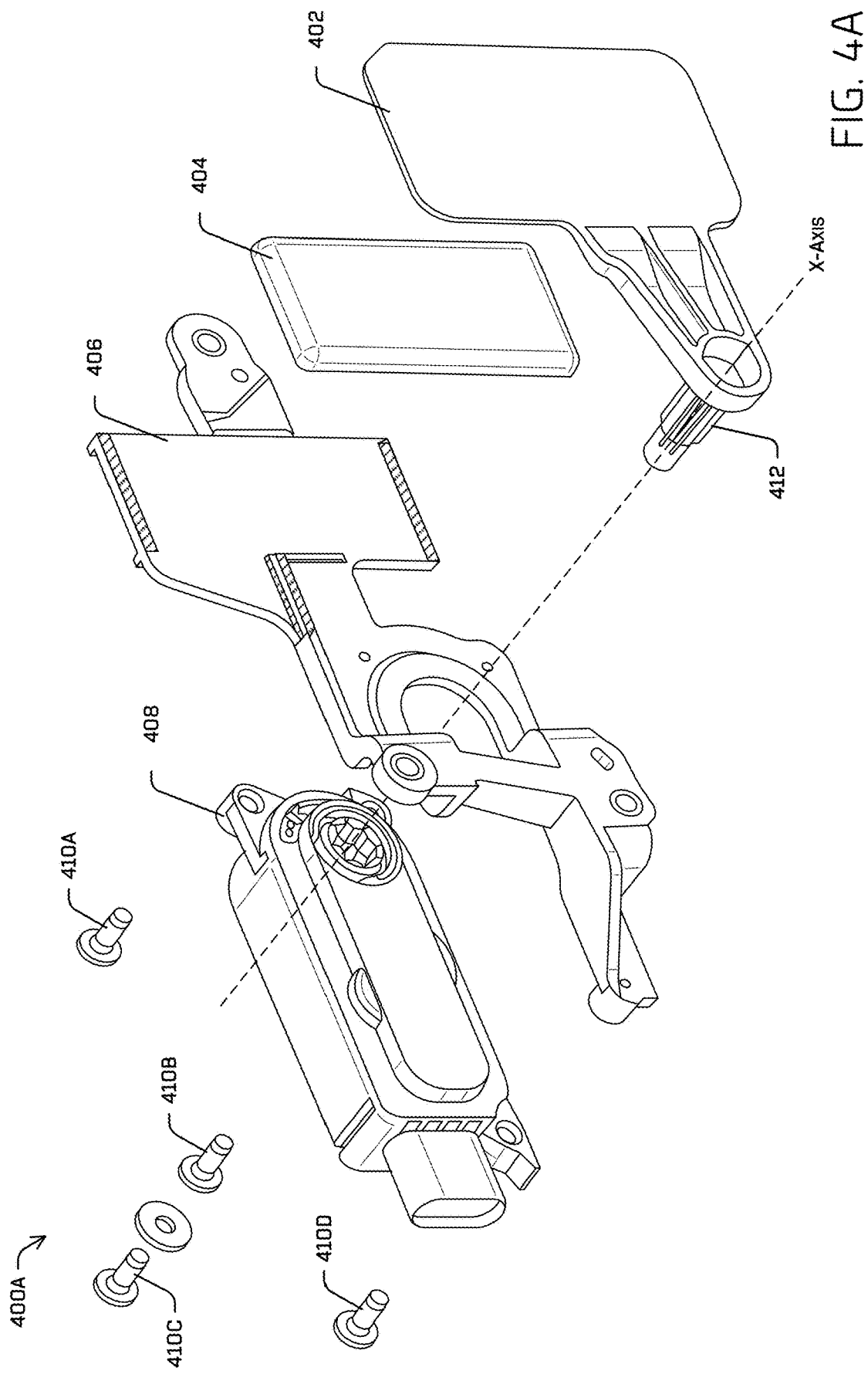
FIG. 4A depicts a perspective view of another example actuator system.

FIG. 4A depicts a perspective view of another example actuator system 400A. The example actuator system 400A may comprise a masking element 402, a retroreflector 404, a retroreflector housing 406, an actuator 408, and one or more couplers 410A, 410B, 410C, 410D.

In some examples, the masking element 402 may comprise of an opaque material that prevents light from reaching retroreflector 404. In some examples, the masking element 402 may comprise of the same or similar material as the vehicle or fascia of the vehicle (in whole or in part). For example, the masking element may comprise of carbon fiber, polymer (e.g., polypropylene, polyethylene, polyurethane, acrylonitrile butadiene styrene (ABS), polycarbonate (PC), polyethylene terephthalate (PET), thermoplastic olefin (TPO), polyphenylene sulfide (PPS), or other composites), fiberglass, aluminum, polymer matrix composites, or any combination thereof. In some examples, the masking element 402 may include a switchable component, such as a switchable glass (e.g., privacy glass), to change an opacity of the masking element 402 in response to a command from the controller.

The masking element 402 may be coupled to the retroreflector housing 406 in a manner that enables the masking element 402 to rotate about an axis and either expose or cover the retroreflector 404. For example, the masking element 402 may be associated with linkage 412 that is configured to couple to the actuator 408. That is, the linkage 412 may be driven by an actuator that is the source of rotary motion. As the linkage rotates, the masking element 402 rotates in conjunction with the linkage 412. In some examples, the actuator may cause the linkage and masking element to rotate in a first direction and cover the retroreflector and the actuator may cause the linkage and masking element to rotate in a second direction opposite the first direction in order to expose the retroreflector. In some examples, a second retroreflector (e.g., an amber or white colored retroreflector) may be coupled to the masking element, the second retroreflector being different than a first retroreflector coupled to the retroreflector housing 406.

The retroreflector 404 may comprise of an optical device configured to reflect light back to its source, regardless of the angle at which the light strikes the optical device. Retroreflectors are configured to enhance visibility and improve detection of the vehicle. In some examples, the retroreflector may comprise glass spheres coated with a reflective material. In such an example, light enters the glass spheres and reflects off the inner reflective coating and back out through the glass, retroreflecting the light. In some examples, the retroreflector 404 may comprise of a series of prisms (e.g., prismatic reflector). In some examples, the retroreflector may be encased in a protective covering, such as glass or plastic cover, to shield the reflective surface from dirt, moisture, and/or physical damage. The retroreflector 404 may be mounted or coupled (e.g., via an adhesive) to a retroreflector housing 406. In some examples, the retroreflector housing 406 may comprise of the same or similar material as masking element 402. The retroreflector housing 406 may be coupled to the actuator 408 in any suitable manner (e.g., via mechanical devices such as screws, bolts, rivets, clamps, and/or adhesive, and the like).

The actuator 408 may comprise a servomotor, electric motor, brushed or brushless motor, stepper motor, hydraulic actuator, electro-hydraulic system, rotary actuator, pneumatic actuator, or any other actuator described throughout the application. The actuator 408 may be controlled based at least in part on a signal indicative of a change in a state of the vehicle, such as a change in travel orientation. In at least one example, the actuator 408 may be a rotary actuator configured to generate a controlled rotational motion or torque around a fixed axis (e.g., x-axis as depicted in FIG. 4A). The actuator may be a rotational actuator configured to impart rotational motion to the linkage and masking element. The rotational motion or force may be applied to linkage 412 and cause the masking element to rotate in a first direction to cover the retroreflector 404 and a second direction to expose the retroreflector 404 to the environment.

The one or more couplers 410A, 410B, 410C, 410D may be configured to couple the actuator 408, retroreflector housing 406, and/or masking element. The one or more couplers may comprise, for example, mechanical devices such as screws, bolts, rivets, clamps, etc. In some examples, the actuator 408 may be coupled to the retroreflector housing via an adhesive (e.g., epoxy resin), snap-fit connections, and the like.

Figure 4B:
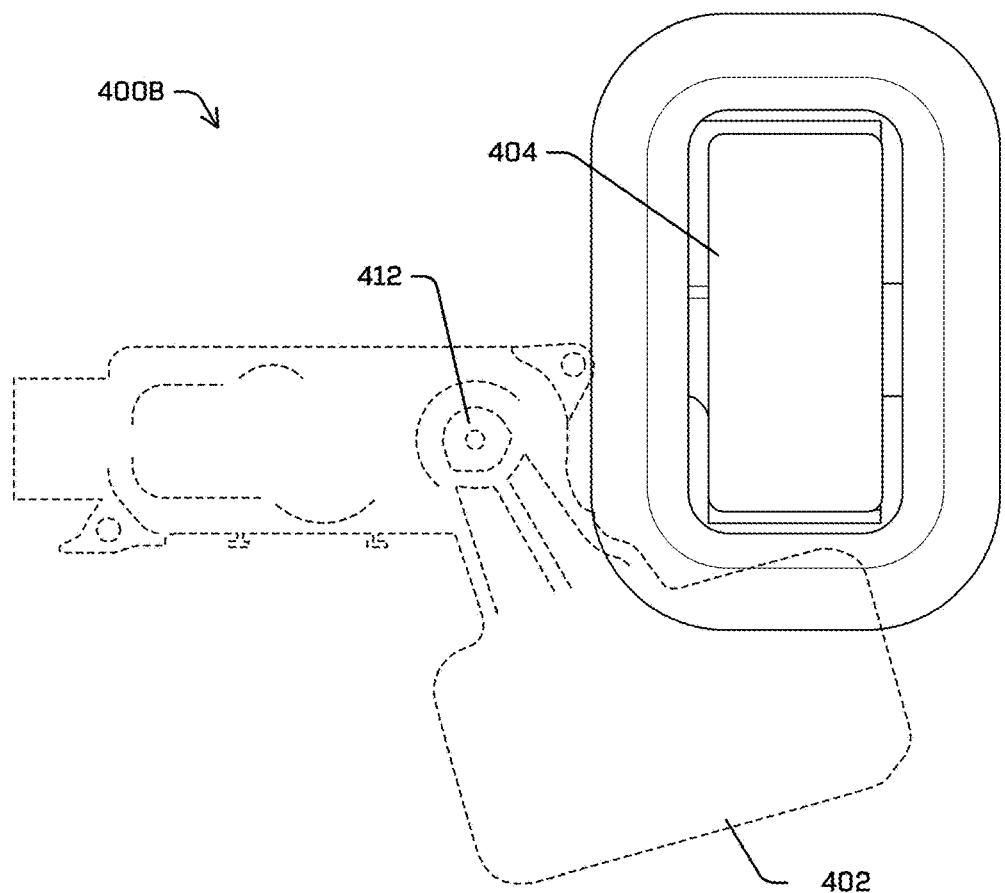
FIG. 4B depicts a front view of the example actuator system of FIG. 4A in a first state.

FIG. 4B depicts a front view of the example actuator system of FIG. 4A in a first state 400B, wherein in the first state the masking element 402 may be positioned such that the retroreflector 404 is exposed to light from the environment. In some examples, the masking element may be disposed or positioned within a slot (not shown) associated with the actuator system, the vehicle, vehicle fascia, etc. In some examples, the slot may be configured such that the masking element 402 is prevented from sliding further back into the actuator system (e.g., a stopper or other mechanical component or obstruction).

Figure 4C:
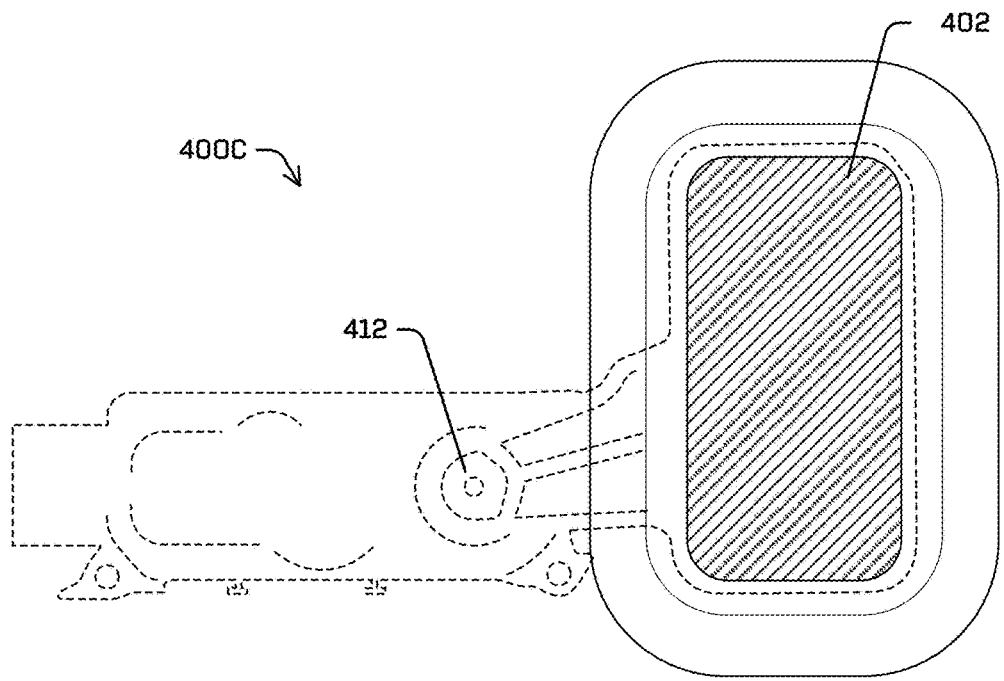
FIG. 4C depicts a front view of the example actuator system of FIG. 4A in a second state.

FIG. 4C depicts a front view of the example actuator system of FIG. 4A in a second state 400C, wherein in the second state the masking element 402 is configured to cover the retroreflector 404. In some examples, a second retroreflector (e.g., amber or white colored retroreflector) or indicia portion may be coupled to the masking element 402 such that, in the second position, the second retroreflector element is exposed to the environment. In at least one example, the masking element 402 partially covers the indicia portion.

Figure 5:
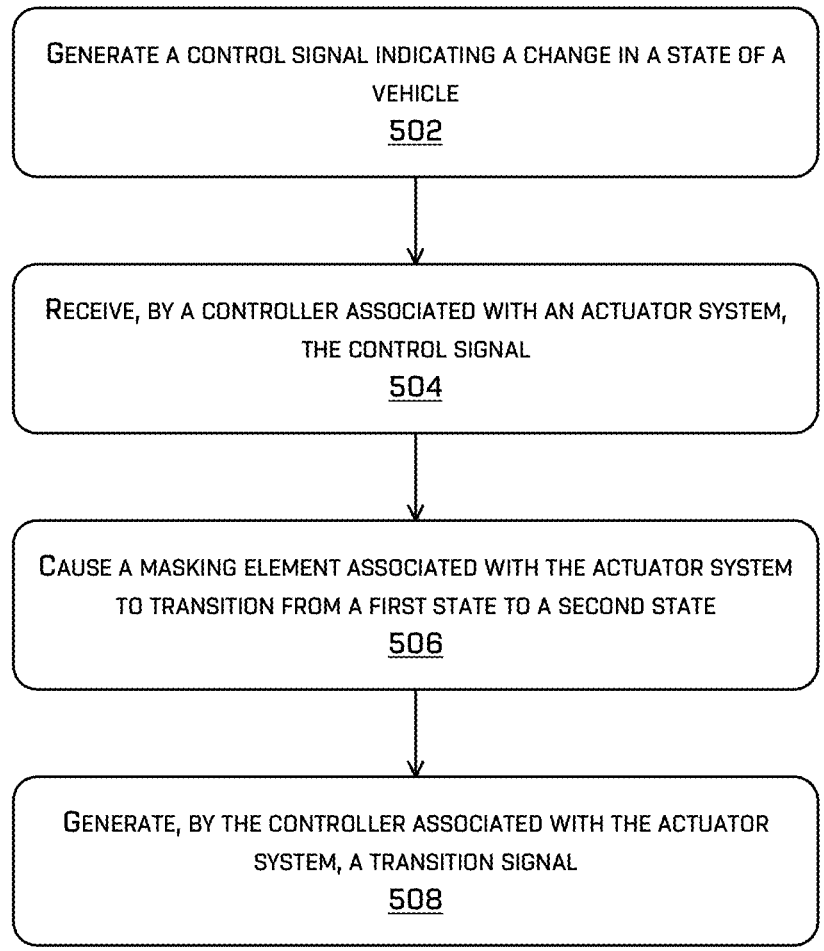
FIG. 5 depicts a flow chart outlining an example process to transition a masking element associated with an actuator system from a first state to a second state using the techniques described herein.

FIG. 5 illustrates a flow chart outlining an example process 500 to transition a masking element associated with an actuator system from a first state to a second state. Example process 500 may represent a sequence of operations that can be implemented in hardware, software, or a combination thereof. In the context of software, the operations represent computer-executable instructions stored on one or more computer readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

At operation 502, a system or component of a vehicle (e.g., planning component, drive component, sensor(s), light emitter(s) systems, steering component, and/or other components or subsystem(s)) may generate a control signal. In examples, the control signal may indicate a state or operation of the vehicle, a planned vehicle state or operation (the vehicle is about to change an orientation of travel), or a change in a travel orientation (i.e., which end of a bidirectional vehicle is a leading end and which end is a trailing end), detecting a fault with a vehicle system or component, etc. In at least one example, the actuator may be coupled to one or more additional components or subcomponents of the vehicle such that a signal comprises one or more of a data or power connection common to the actuator and other component. As a non-limiting example of which, a line providing power to brake lights may be used to power the actuator such that when a signal is sent to power on brake lights, the actuator is also engaged. In some examples, the control signal may be associated with a passage of time (e.g., 10 seconds, 15 seconds, . . . N seconds etc.), a distance (50 meters, 1 mile, 5 miles, . . . N miles etc.), a location or map data, time of day, or any other change in a state of the vehicle.

At operation 504, a controller associated with an actuator system may receive the control signal. The controller may control a position or state of various components associated with the actuator system based on the received control signal. For example, if a vehicle is travelling so that a first end of the vehicle is leading the second end, then an actuator system on the first end of the vehicle may be configured in a first state (e.g., a closed state) such that a white or amber retroreflector is visible and a second actuator system on the second end of the vehicle may be configured in a different state (e.g., an open state) such that a red retroreflector is visible. On the other hand, if the vehicle is travelling so that the second end of the vehicle is leading the first end, then the actuator systems may function oppositely, based on the control signal from the planning component. In some examples, the controller may be configured to receive signals from a source external to the vehicle, such as from an autonomous vehicle service platform, remote computing device (e.g., teleoperator computing device), etc. In some examples, different actuator systems may be configured to communicate or receive signals from different systems or components associated with the vehicle. As above, such a signal may additionally or alternatively be coupled to one or more components or subcomponents of the vehicle as a common signal or power.

In some examples, the operation of the actuator may be based at least in part on receiving a signal generated by at least one of an emitter system or a steering system. That is, the actuator system may be coupled to and/or be configured to receive signals from a light emitter system (e.g., headlight/brake light system or components, turn signal system or component, etc.) that generates a signal indicating a change in a state (e.g., change in a function or color). The signal generated by the light emitter system may then be utilized to control a change a state of the masking element. This enables the actuator system to efficiently operate in conjunction with existing components and systems of the vehicle. As another nonlimiting example, the operation of the actuator system may be based at least in part on receiving a signal generated by a steering system of the vehicle. That is, when a bidirectional vehicle changes a direction of travel (e.g., reverses a direction of travel), the steering system may generate and/or receive signals that control a behavior of the wheels, steering angles, etc. These signals may be configured to also control an operation of the actuator system such that additional (or separate) control signals need not be generated specific to the actuator system. In some examples, the signal may be any type of signal generated by a component or system associated with the vehicle (e.g., a communication signal, a power signal, voltage change signal, brake signal, acceleration signal, speed signal, fuel level signal, airbag deployment signal (or other safety feature signal), door open/closed signal, turn signal, etc.).

At operation 506, an actuator associated with the actuator system may cause a masking element to transition from a first state to a second state. An actuator (e.g., a servomotor, electric motor, brushed or brushless motor, stepper motor, hydraulic actuator, electro-hydraulic system, linear actuator, rotary actuator, pneumatic actuator, etc.) may be coupled to the masking element via one or more linkages (e.g., rack, gear, pinion, hydraulic piston, pin, link, arm, etc.). In at least one example, individual (or multiple) actuators may be coupled to the masking element. The actuator, when activated, may be configured to cause the masking element to transition from the first state to the second state. For example, a first state of the masking element may be associated with a first position (e.g., an open position) that exposes an indicia portion (e.g., a retroreflector license plate, RFID tag, permit, etc.). The second state of the masking element may be associated with a second position (e.g., a closed position) that conceals or masks the indicia portion. In at least one example, in response to receiving a signal indicating a bidirectional vehicle has changed a direction of travel, the actuator system may cause a first set of one or more actuator systems disposed on a first end of the vehicle to transition from a first state to a second state and cause a second set of one or more actuator systems disposed on a second end opposite the first end of the vehicle to transition from the second state to the first state.

At operation 508, the actuator system may generate a transition signal. The transition signal may represent a confirmation that the masking element has transitioned to a different state. In some examples, the transition signal may indicate feedback of a state associated with the actuator system (e.g., change in voltage, rotary encoder message, rotation angle, etc.). For example, the actuator system may provide a feedback signal indicating the actuator system has changed a state of the masking element. In some examples, a controller associated with the actuator system may transmit the transition signal to a component and/or system of the vehicle (e.g., planning component, sensor system, memory, etc.). In some examples, the transition signal may include a time at which the masking element of the actuator system has started a transition process and/or a time at which the masking element has completed the transition process. The transition signal may be stored in a memory associated with the vehicle and/or in some other memory, such as a remote memory associated with a remote computing device.

Figure 6:
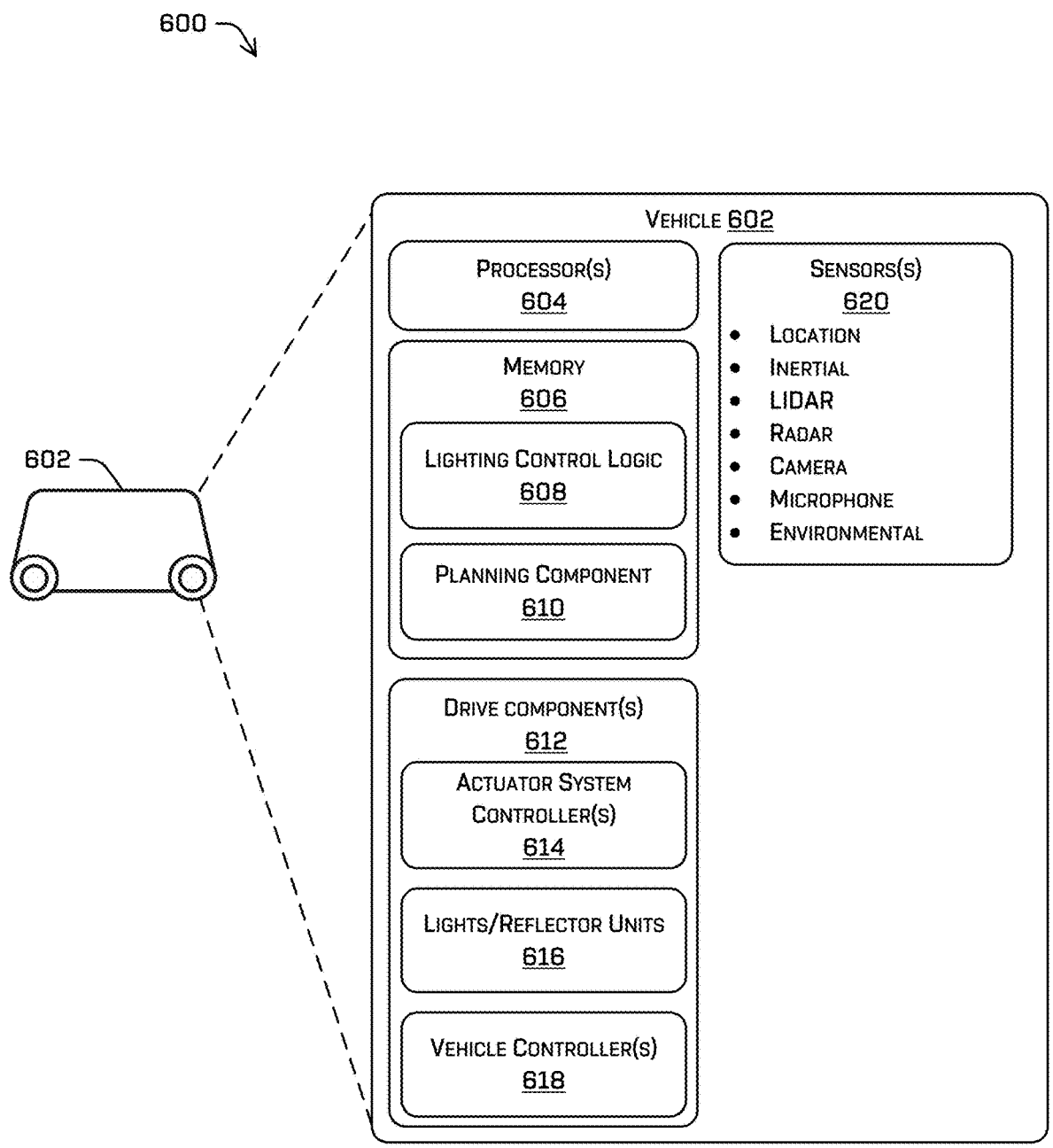
FIG. 6 depicts a block diagram of an example system for implementing various actuator systems, as described herein.

FIG. 6 is a block diagram of a system 600, including a vehicle 602, for implementing various actuator systems and active light systems, as described herein. System 600 may be configured to control operation of the vehicle, which may be an autonomous vehicle, and to control various lighting functions. In some examples, system 600 may include processor(s) 604 and/or memory 606. These elements are illustrated in combination in FIG. 6, although it is understood that they may be separate elements of system 600, and that components of the system may be implemented as hardware and/or software, in some examples.

Processor(s) 604 may include a uniprocessor system including one processor, or a multiprocessor system including several processors (e.g., two, four, eight, or another suitable number). Processor(s) 604 may be any suitable processor capable of executing instructions. For example, in various implementations, processor(s) 604 may be general-purpose or embedded processors implementing any of a variety of instruction set architectures (ISAs), such as the x86, PowerPC, SPARC, or MIPS ISAs, or any other suitable ISA. In multiprocessor systems, each processor 604 may commonly, but not necessarily, implement the same ISA. In some examples, the processor(s) 604 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

System 600 may include memory 606. In some examples, memory 606 may include a non-transitory computer readable media configured to store executable instructions/modules, data, and/or data items accessible by processor(s) 604. In various implementations, the non-transitory computer readable media may be implemented using any suitable memory technology, such as static random-access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to system 600. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s), for example.

Furthermore, though illustrated as a single unit in FIG. 6, it is understood that processor(s) 604 and memory 606 may be distributed among multiple computing devices of the vehicle and/or among multiple vehicles, data centers, tele-operation centers, etc. In some examples, processor(s) 604 and memory 606 may conduct at least some of the techniques discussed herein.

Memory 606 may include lighting control logic 608, which may include algorithms to control the movement, rotation, illumination, etc. of various components of an actuator system. For example, such algorithms may dictate a time of when to initiate a change in a state of an actuator system. An algorithm may be used to check or verify certain conditions or criteria (e.g., based on time, external events, sensor inputs, etc.). Based on the evaluation of the conditions, the algorithm may determine when to initiate a state change of an actuator system (i.e., the masking element). The algorithm may trigger the initiations of the state change at a predetermined time. Accordingly, the algorithms could be applied to a controller associated with an actuator system as needed.

System 600 may include network interface(s) configured to establish a communication link (i.e., "network") between the system and one or more other devices. In various implementations, the network interface(s) may support communication via wireless general data networks, such as a Wi-Fi network, and/or telecommunications networks, such as, for example, cellular communication networks, satellite networks, and the like. In some examples, sensor data, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal but may transmit the received signal to a second vehicle and/or remote computing device.

Memory 606 may include a planning component 610 that can determine a path for vehicle 602 to follow to traverse through an environment. For example, planning component 610 can determine various routes and trajectories and various levels of detail. For example, planning component 610 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, planning component 610 can generate an instruction for guiding the autonomous vehicle along at least a portion of the route from the first location to the second location. In at least one example, planning component 610 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for vehicle 602 to navigate.

Planning component 610 may generate a direction signal that indicates the direction of vehicle travel. An actuator system controller may receive the direction signal and control a position or state of various components associated with the actuator system based on this signal. For example, if vehicle 602 is travelling so that a first end of the vehicle is leading the second end, then a masking element associated with an actuator system may be in a first state on the first end of the vehicle that exposes or presents a white reflector and a masking element associated with the actuator system on the second end of the vehicle may be configured in a second state (e.g., exposes or presents a red retroreflector). On the other hand, if the vehicle is travelling so that the second end of the vehicle is leading the first end, then the states of the actuator systems may be opposite, based on the direction signal from planning component 610.

System 600 may include one or more drive components 612. In some instances, the vehicle may have a single drive component. In some instances, drive component(s) 612 may include one or more sensors to detect conditions of drive component(s) 612 and/or the surroundings of the vehicle. Drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights and/or one or more illumination units and light units for signaling or illuminating an exterior surrounding of the vehicle), and one or more other systems (e.g., cooling system, safety systems, onboard charging system, other electrical components such as a DC/DC converter, a high voltage junction, a high voltage cable, charging system, charge port, etc.).

Drive component(s) 612 may include an actuator system controller(s) 614 and lights/reflector unit(s) 616. Actuator system controller(s) 614 may comprise one or more individual controllers. Actuator system controller 614 may be communicatively coupled to one or more other actuator system controllers, which in turn may be communicatively coupled to a vehicle controller 618 that at least partially manages various operations of the vehicle. Lights/reflector unit(s) 616 may comprise one or more reflector unit controllers and light units. Lights/reflector unit(s) 616 may also comprise various other lighting, such as license plate lights, side marker lights, and so on. Lighting of vehicle 602 may be configured to operate in a fashion that allows for lighting redundancy on each end of the vehicle, as described above. Accordingly, in some implementations, control of lights and reflector units of vehicle 602 may be shared among two or more such actuator system controllers. For example, some actuator systems of the vehicle may be controlled by a first actuator system controller while other actuator systems of the vehicle may be controlled by a second actuator system controller.

Additionally, drive component(s) 612 may include a vehicle controller 618 which may receive and preprocess data from the sensor(s) and to control operation of the various vehicle systems. In some instances, the vehicle controller 618 may include one or more processors and memory communicatively coupled with the one or more processors. The memory may store one or more components to perform various functionalities of drive component(s) 612. Furthermore, drive component(s) 612 may also include one or more communication connection(s) that enable communication by the respective drive component with one or more other local or remote computing device(s).

System 600 may include sensor(s) 620 configured to localize the vehicle 602 in an environment, to detect one or more objects in the environment, to sense movement of the vehicle through its environment, sense various optical characteristics (e.g., intensity and spectra) of incoming light, sense environmental data (e.g., ambient temperature, pressure, and humidity), and/or sense conditions of an interior of the vehicle (e.g., passenger count, interior temperature, noise level). Sensor(s) 620 may include, for example, one or more LIDAR sensors, one or more cameras (e.g. RGB-cameras, intensity (grey scale) cameras, infrared cameras, depth cameras, stereo cameras), one or more magnetometers, one or more radar sensors, one or more sonar sensors, one or more microphones, one or more inertial sensors (e.g., accelerometers, gyroscopes), one or more GPS sensors, one or more wheel encoders, one or more drive system sensors, a speed sensor, a photosensor(s) (e.g., 814) and/or other sensors related to the operation of the vehicle.

Example Clauses

Any of the example clauses in this section may be used with any other example clauses and/or any of the other examples described herein.

A. A bidirectional vehicle comprising: a fascia having a first side and a second side; and an actuator system coupled to the fascia, the actuator system comprising: an indicia portion; a masking element that exposes the indicia portion in a first state and covers the indicia portion in a second state; and linkage coupling the masking element to an actuator; wherein operation of the actuator applies force via the linkage to the masking element to cause the masking element to transition between the first state and the second state.

B. The bidirectional vehicle of paragraph A, wherein the operation of the actuator is based at least in part on a determination of the bidirectional vehicle changing a direction of travel.

C. The bidirectional vehicle of paragraphs A or B, wherein the indicia portion is a first indicia portion, and the masking element comprises a second indicia portion different than the first indicia portion.

D. The bidirectional vehicle of paragraphs A-C, wherein the actuator system is a first actuator system disposed on a first longitudinal end of the bidirectional vehicle, the bidirectional vehicle further comprising: a second actuator system disposed on a second longitudinal end of the bidirectional vehicle opposite the first longitudinal end, the second actuator system comprising: a second indicia portion; and a second masking element that exposes the second indicia portion in the first state and covers the second indicia portion in the second state; wherein the second masking element is in the first state while the first masking element is in the second state.

E. The bidirectional vehicle of paragraph A, wherein the actuator comprises a linear actuator configured to impart linear translation motion to the masking element.

F. The bidirectional vehicle of paragraph A, wherein the actuator comprises a rotational actuator configured to impart rotational motion to the masking element.

G. The bidirectional vehicle of paragraphs A-F, wherein the actuator system further comprises: a coupler configured to couple the masking element to the linkage such that the masking element is offset in a longitudinal direction relative to the linkage and the actuator.

H. The bidirectional vehicle of paragraphs A-G, wherein the indicia portion comprises one of a retroreflector, an emitter, a license plate, radio-frequency identification (RFID) tag, a permit, a display, an identification number, or a machine-readable code.

I. The bidirectional vehicle of paragraphs A-H, wherein the masking element comprises a reflective element.

J. A system configured to operate on a vehicle, the system comprising: an actuator system coupled to the vehicle, the actuator system comprising: an indicia portion; a masking element that exposes the indicia portion in a first state and covers the indicia portion in a second state; and linkage coupling the masking element to an actuator; wherein operation of the actuator applies force via the linkage to the masking element to cause the masking element to transition between the first state and the second state.

K. The system of paragraph J, wherein the actuator system is a first actuator system and is configured to operate on a first longitudinal end of the vehicle, the system further comprising: a second actuator system disposed on a second longitudinal end of the vehicle, the second actuator system comprising: a second indicia portion; and a second masking element that exposes the second indicia portion in the first state and covers the second indicia portion in the second state; wherein the second masking element is in the first state while the first masking element is in the second state.

L. The system of paragraphs J or K, wherein the operation of the actuator is based at least in part on a signal generated by at least one of an emitter system or a steering system associated with the vehicle.

M. The system of paragraphs J-L, wherein the indicia portion is a first indicia portion, and the masking element comprises a second indicia portion different than the first indicia portion.

N. The system of paragraphs J-M, wherein the actuator system further comprises: a coupler configured to couple the masking element to the linkage such that the masking element is offset in a longitudinal direction relative to the linkage and the actuator.

O: An actuator system comprising: an indicia portion; a masking element that exposes the indicia portion in a first state and covers the indicia portion in a second state; and a linkage coupling the masking element to an actuator; wherein operation of the actuator applies force via the linkage to the masking element to cause the masking element to transition between the first state and the second state.

P: The actuator system of paragraph O, wherein the actuator comprises a linear actuator configured to impart linear translation motion to the masking element.

Q. The actuator system of paragraph O, wherein the actuator comprises a rotational actuator configured to impart rotational motion to the masking element.

R. The actuator system of paragraphs O-Q, wherein the actuator system further comprises: a coupler configured to couple the masking element to the linkage such that the masking element is offset in a longitudinal direction relative to the linkage and the actuator.

S. The actuator system of paragraphs O-R, wherein the indicia portion is a first indicia portion, and the masking element comprises a second indicia portion different than the first indicia portion.

T. The actuator system of paragraphs O-S, wherein the actuator system is coupled to a vehicle and wherein operation of the actuator is based at least in part on a determination of the vehicle changing a direction of travel.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples. It is to be understood that other examples can be used and that changes or alterations, such as structural changes, can be made. Such examples, changes or alterations are not necessarily departures from the scope with respect to the intended subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A bidirectional vehicle comprising:
a first longitudinal end and a second longitudinal end;
a first actuator system disposed on the first longitudinal end, the first actuator system comprising:
a first indicia portion;
a first masking element that exposes the first indicia portion in a first state and covers the first indicia portion in a second state; and
a linkage coupling the first masking element to an actuator, wherein operation of the actuator applies force via the linkage to the first masking element to cause the first masking element to transition between the first state and the second state; and
a second actuator system disposed on the second longitudinal end, the second actuator system comprising:
a second indicia portion; and
a second masking element that exposes the second indicia portion in the first state and covers the second indicia portion in the second state, wherein the second masking element is configured to be in the first state while the first masking element is in the second state.

2. The bidirectional vehicle of claim 1, wherein the operation of the actuator is based at least in part on a determination of the bidirectional vehicle changing a direction of travel.

3. The bidirectional vehicle of claim 1, wherein the first masking element comprises a third indicia portion different than the first indicia portion.

4. The bidirectional vehicle of claim 1, wherein the first indicia portion comprises a first retroreflector and the second indicia portion comprises a second retroreflector.

5. The bidirectional vehicle of claim 1, wherein the operation of the actuator is based at least in part on receiving a signal generated by at least one of an emitter system or a steering system associated with the bidirectional vehicle.

6. The bidirectional vehicle of claim 1, wherein the actuator comprises a linear actuator configured to impart linear translation motion to the first masking element.

7. The bidirectional vehicle of claim 1, wherein the actuator comprises a rotational actuator configured to impart rotational motion to the first masking element.

8. The bidirectional vehicle of claim 1, wherein the first actuator system further comprises:
a coupler configured to couple the first masking element to the linkage such that the first masking element is offset in a longitudinal direction relative to the linkage and the actuator.

9. The bidirectional vehicle of claim 1, wherein the first indicia portion comprises one of a retroreflector, an emitter, a license plate, radio-frequency identification (RFID) tag, a permit, a display, an identification number, or a machine-readable code.

10. The bidirectional vehicle of claim 1, wherein the first masking element comprises a reflective element.

11. A system configured to operate on a vehicle, the system comprising:
a first actuator system coupled to a first longitudinal end of the vehicle, the first actuator system comprising:
a first indicia portion;
a first masking element that exposes the first indicia portion in a first state and covers the first indicia portion in a second state; and
a linkage coupling the first masking element to an actuator, wherein operation of the actuator applies force via the linkage to the first masking element to cause the first masking element to transition between the first state and the second state; and
a second actuator system coupled to a second longitudinal end of the vehicle, the second actuator system comprising:
a second indicia portion; and
a second masking element that exposes the second indicia portion in the first state and covers the second indicia portion in the second state, wherein the second masking element is configured to be in the first state while the first masking element is in the second state.

12. The system of claim 11, wherein the operation of the actuator is based at least in part on a signal generated by at least one of an emitter system or a steering system associated with the vehicle.

13. The system of claim 11, wherein the first masking element comprises a third indicia portion different than the first indicia portion.

14. The system of claim 11, wherein the first actuator system further comprises:
a coupler configured to couple the first masking element to the linkage such that the first masking element is offset in a longitudinal direction relative to the linkage and the actuator.

15. An actuator system comprising:
a first indicia portion;
a masking element that exposes the first indicia portion in a first state and covers the first indicia portion in a second state, the masking element comprising a second indicia portion different than the first indicia portion; and
a linkage coupling the masking element to an actuator, wherein operation of the actuator applies force via the linkage to the masking element to cause the masking element to transition between the first state and the second state.

16. The actuator system of claim 15, wherein the actuator comprises a linear actuator configured to impart linear translation motion to the masking element.

17. The actuator system of claim 15, wherein the actuator comprises a rotational actuator configured to impart rotational motion to the masking element.

18. The actuator system of claim 15, wherein the actuator system further comprises:

a coupler configured to couple the masking element to the linkage such that the masking element is offset in a longitudinal direction relative to the linkage and the actuator.

19. The actuator system of claim 15, wherein the actuator system is coupled to a vehicle and wherein operation of the actuator is based at least in part on a determination of the vehicle changing a direction of travel.

20. The actuator system of claim 15, wherein the first indicia portion comprises a first retroreflector and the second indicia portion comprises a second retroreflector.

\* \* \* \* \*